United States Patent [19]
Ribba

[11] 3,817,949
[45] June 18, 1974

[54] UNSATURATED ACID-ALLYL ACETAL POLYMERS
[75] Inventor: Alain Ribba, Chateaurenault, France
[73] Assignee: Manufacture De Produits Chimiques Protex, Paris, France
[22] Filed: Mar. 8, 1972
[21] Appl. No.: 232,907

[30] Foreign Application Priority Data
    Mar. 30, 1971  France .................... 71.12009

[52] U.S. Cl. .................... 260/80.3 E, 260/29.7 H, 260/78.5 BB, 260/85.5 ZA
[51] Int. Cl. ............................ C08f 15/02
[58] Field of Search.. 260/80.3 E, 78.5 BB, 85.5 ZA

[56] References Cited
    UNITED STATES PATENTS
    2,487,879  11/1949  Kenyon et al..................... 260/86.1

Primary Examiner—Stanford M. Levin
Attorney, Agent, or Firm—John J. McGlew

[57] ABSTRACT

Reticulated carboxylic copolymers in powder form, for use as thickening agents in an aqueous medium, and method of preparing same, are composed of 85 to 99% of an unsaturated $\alpha\beta$ acid such as acrylic acid, methacrylic acid or like substances, and 0.1 to 15% of an acetal of which the initial materials are allyl alcohol and dialdehyde $(CH_2=CH-CH_2-O)_2-CH(CH_2)_n-CH(O-CH_2-CH=CH)_2$ wherein $n$ designates an integer of 0 to 2.

9 Claims, No Drawings

UNSATURATED ACID-ALLYL ACETAL POLYMERS

BACKGROUND OF THE INVENTION

1. Field of the Invention

This invention relates to reticulated carboxylic copolymers in powder form, which are useful as thickening agents in an aqueous medium.

2. Description of the Prior Art

The first synthetic thickening agents produced in the art were the salts of polyacrylic acid or polymethacrylic acid which are obtained:

either directly, by effecting a polymerization of the acrylic and methacrylic acids followed by a neutralization, or preferentially, by hydrolyzing either a methylor ethyl polyacrylate solution or a polyacrylonitrile powder.

The products thus obtained constitute high-viscosity solutions requiring a 5 to 10 % dilution for handling them; moreover, such products are difficult to dry so that they must be stored at a moderate concentration, which is rather uneconomical from an industrial point of view.

A marked improvement was obtained through the development of aqueous emulsions of copolymers of acrylic (or methacrylic) esters with acrylic (or methacrylic) acid more or less reticulated. These emulsions dissolve well in water at a nearly neutral pH value (pH = 6 to 7) to yield appreciable viscosities. These improved products are advantageous in comparison with the preceding ones due to the possibility of thickening in situ from a fluid emulsion containing a dry extract of 25 to 40 %; but notwithstanding this improvement it is not possible to dry and obtain a definitely dry product on a commercial scale.

The present invention relates essentially, as novel industrial products, to thickening agents containing 100 % of dry extract. These products, after neutralization yield high-viscosity products which result from the copolymerization of unsaturated α and β acids with the above-defined products having several double bonds and an acetal composition in a medium which is both solvent of for monomers and non-solvent for polymers, and this copolymerization is performed by using organic catalysts which are known per se.

These acetals which from the action of allyl alcohols on dialdehydes, have the following general formula:

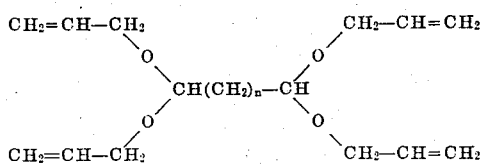

with n selected from an integer in the range 0 – 2.

As already explained in the foregoing discussion, these acetals are obtained through the reaction of allyl alcohol with dialdehydes, such as glyoxal. These acetals are prepared in a solvent medium by acid catalysis at about 80° C. The reaction water is eliminated azeotropically.

A particularly efficient product in the field of this invention is tetraallyloxetane obtained through the reaction of allyl alcohol with glyoxal, the preparation of which is described in the Belgian patent no. 609,343. The formula of this product

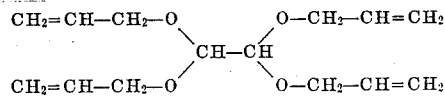

Another product suitable for this purpose according to the invention is, for example, tetraallyl oxypropane having the formula:

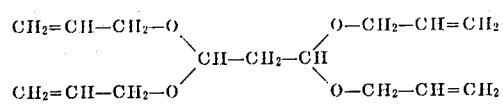

To obtain the desired thickening properties the amount of reticulating products mentioned hereinabove should range from about 0.1 % to about 15 %, and preferably from 0.5 % to 10 % of the total amount of monomers.

These novel allyl acetals of dialdehydes — and this constitutes an essential feature characterising this invention — are capable of yielding considerably better thickening agents than the copolymers of unsaturated α and β acids and acrylic polyfunctional monomers such as trimethylolpropane triacrylate or pentaerithytol tetramethacrylate, for instance.

These reticulating products are copolymerized with 85 % to 99.9 %, and preferably with 90 % to 99.5 %, of unsaturated α and β acids, such as acrylic acid, methacrylic acid, itaconic acid, chloroacrylic acid, cyanoacrylic acid, bromoacrylic acid, α - phenylacrylic acid, α - benzyl-acrylic acid and other acids, or with a mixture of these acids with one another in variable proportions. However, acrylic acid is preferred in the case of the present invention.

The copolymers of the present invention are obtained by copolymerization in a solvent capable of solubilizing monomers but not capable of the solubilizing copolymers resulting therefrom.

Such solvent must be inert with respect to the monomers and the copolymer. Said solvent is selected preferably from one among the aromatic or aliphatic carbides, but any other solvent meeting the above-listed requirements may be used as well.

One of the preferred solvents of the present invention is toluene, for it has a relatively high boiling point, which is preferable to avoid agglomerates. The amount of monomers in the solvent ranges from 5 % to 20 %, but is preferably of the order of 8 % to 12 % so as to yield a fine powder, without any agglomerated. Moreover, at a higher concentration the reaction would be exothermic and it would be difficult to maintain the desired polymerization temperature.

The polymerization temperature is maintained at 30° to 90° C according to the desired molecular weight. Preferably, the polymerization temperature will lie in the range of about 45° to 60° C in order to obtain a suitable polymerization rate and a sufficiently high molecular weight.

The catalysts used for the purposes of this invention are organic catalysts of conventional type, such as azobis-isobutyronitrile, benzoyl peroxides, cumene hydroperoxide, tertiarybutyl hydroperoxide; the amounts of catalysts utilized may range from 0.5 % to 5 % and preferably from 0.5 % to 2 % of the monomers.

The aforementioned monomers and catalysts are dissolved together in the solvent to be used as a reaction medium, within a reaction vessel equipped with an agitator, a thermometer and a cooling system. At the end of the dissolution of the reactants, the assembly is heated to 55° to 60° C in a nitrogen atmosphere during 4 to 5 hours, until a fine precipitate is obtained, which is subsequently filtered and dried. The thickening properties are determined by measuring the viscosity of the solution of this novel product in water at different concentrations and pH values.

The maximum viscosity is obtained, in water, at a neutral or basic pH value, by neutralizing the COOH groups. The bases generally employed for neutralizing these COOH groups are sodium, ammonia, potash, lithium hydroxide, sodium or potassium carbonates and bicarbonates, or mixtures of these various bases. The water-soluble primary, secondary or tertiary amines, such as triethanolamine, may also be used. As a rule, the thickening effect attains a maximum value when 70 to 75 % of the COOH groups have been neutralized and converted into alkali or ammonium or amine salts. This maximum value is found at a pH value of 6.5 - 7.5. It may be noted that like all polyelectrolytes the copolymers of this invention are sensitive to the presence of a polyvalent metal ion, the viscosity of the solutions decreases for example in the presence of ions:

$Ca^{2+}$ or $AL^{3+}$

The products obtained according to this invention are used to advantage each time it is desired to thicken aqueous solutions, a latex before coating, a sizing bath, a paint . . . The amounts implemented vary each time according to the specific composition of the medium to be thickened. However, in general amounts of less than 1% are sufficient for obtaining the desired viscosities.

To thicken a medium one may prepare either an aqueous dispersion of the copolymers according to this invention, which is brought to a pH value of $\approx 7$, before introducing same into the medium to be thickened. Alternatively a dispersion of the copolymers of this invention is introduced directly into the medium to be thickened, followed by a neutralization by using a suitable base. It appeared that the products of this invention have a considerable thickening power, even when used at very moderate doses. Thus, solutions having a concentration of 0.025 % to 0.1 % have a far from negligible viscosity of pH $\approx 7$, after neutralization by using one of the above-mentioned bases, in comparison with conventional products displaying very moderate viscosities at these concentrations.

The following examples, are given by way of illustration, not of limitation.

EXAMPLE 1

In a 2-liter reaction vessel equipped with a central agitator, an upward-flow refrigerator, a nitrogen bubbling tube and a thermometer, the following substances are introduced:

Toluene = 1,500 g; Acrylic acid = 170 g; Tetraallyloxetane = 3.5 g and Benzoyl peroxide = 2 g. The mix is maintained in $N_2$ during 5 to 6 hours at 55° to 60° C. An exothermic reaction is produced, and the product begins to precipitate in the form of a solvent-swollen powder.

After 5 to 6 hours the product is cooled, discharged while filtering, and dried at 50° C in vacuo.

The end product is a fine, white, low-density fine powder. The yield is 98 %.

One gram of this resultant powder is dispersed in 400 g of deionized water to obtain a 0.25 % concentration. Then the product is neutralized at pH = 7 by using ammonia. The solution becomes a gel having a viscosity of 9,000 centipoises measured in a Brookfield R V 6 speed 20 apparatus.

By way of comparison, a conventional thickening agent (copolymer of ethyl acrylate — methacrylic acid — diallyl maleate in the proportion of 60, 40 and 0.2 respectively, utilized with 28 % of dry substances) yields a water solution containing 1 % of dry product having a viscosity of 2,000 centipoises under the same measurement conditions, after neutralization with ammonia. At a 0.25 % concentration the viscosity is $\approx 10$ cps.

Similarly, by adhering to the procedure of this Example 1 but substituting trimethylolpropane trimethacrylate for tetraallyloxetane, the resultant powder redissolved at 0.25 % in water and brought to a pH value of 7 by using ammonia, has a viscosity of 150 cps (measured with Brookfield R V 6 speed 20).

EXAMPLE 2

The procedure of Example 1 is adhered to, and methacrylic acid is substituted for acrylic acid, weight by weight, with different tetraallyloxetane percentages.

The results are summarized in the following Table:

Table I

| % of tetraallyloxetane | Viscosity of a 0.25% solution (Brookfield R V 6 speed 20) |
|---|---|
| 1 % | 30 cps at pH = 7 with $NH_4OH$ |
| 2 % | 50 cps |
| 3 % | 1,250 cps |
| 4 % | 1,000 cps |

If trimethacrylate of tetramethylpropane is substituted for tetraallyloxetane, no increment in the viscosity of the 0.25 % solutions is observed.

EXAMPLE 3

The procedure of Example 1 is adhered to again, by varying the tetraallyloxetane percentage. The results are summarized in the following Table:

Table II

| % of tetraallyloxetane | Viscosity of a 0.25% solution (Brookfield R V 6 speed 20) |
|---|---|
| 1 % | 750 cps |
| 2 % | 9,000 cps |
| 3 % | 2,750 cps at pH 7 with $NH_4OH$ |
| 5 % | 150 cps |
| 6 % | 30 cps |

EXAMPLE 4

The same powder is used by adding 2% of tetraallyloxetane and 98 % of acrylic acid thereto. Solutions having different concentrations are prepared in water neutralised (pH 7) with $NH_4OH$. The Brookfield viscosity values are given hereinafter:

0.025% solution → h = 10 cps (speed 20)
0.10 % solution → h = 400 cps (speed 20)
0.25 % solution → h = 9,000 cps (speed 20)
0.5 % solution → h = 30,000 cps (speed 20).

What I claim as new is:

1. New reticulated copolymers in powder form useful as thickening agents in aqueous compositions consisting essentially of copolymers of:
   a. 85 to 99.9% by weight of at least one ethylenically unsaturated carboxylic acid monomer of the formula:

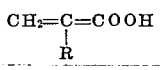

R being a member selected from the group consisting of: H, $CH_3$, Cl, Br, CN, $C_6H_5$, $CH_2-C_6H_5$, $CH_2-CooH$
   b. 0.1 to 15% by weight of an acetal monomer of the formula:

$(CH_2=CH-CH_2-O)_2-CH-(CH_2)_n-CH(O-CH_2-CH=CH_2)_2$ wherein $n$ is an integer of from 0 to 2.

2. New copolymers according to claim 1, where R is H.
3. New copolymers according to claim 1, where R is $CH_3$.
4. New copolymers according to claim 1, where $n$ is 0.
5. New copolymers according to claim 1, where $n$ is 1.
6. New copolymers according to claim 2, where $n$ is 0.
7. New copolymers according to claim 2, where $n$ is 1.
8. New copolymers according to claim 3, where $n$ is 0.
9. New copolymers according to claim 3, where $n$ is 1.

* * * * *